E. A. DE WATERS.
CLUTCH.
APPLICATION FILED OCT. 8, 1917.

1,287,257.

Patented Dec. 10, 1918
2 SHEETS—SHEET 1.

Inventor
Enos A. DeWaters
By
Whittemore, Hulbert & Whittemore
Attorneys

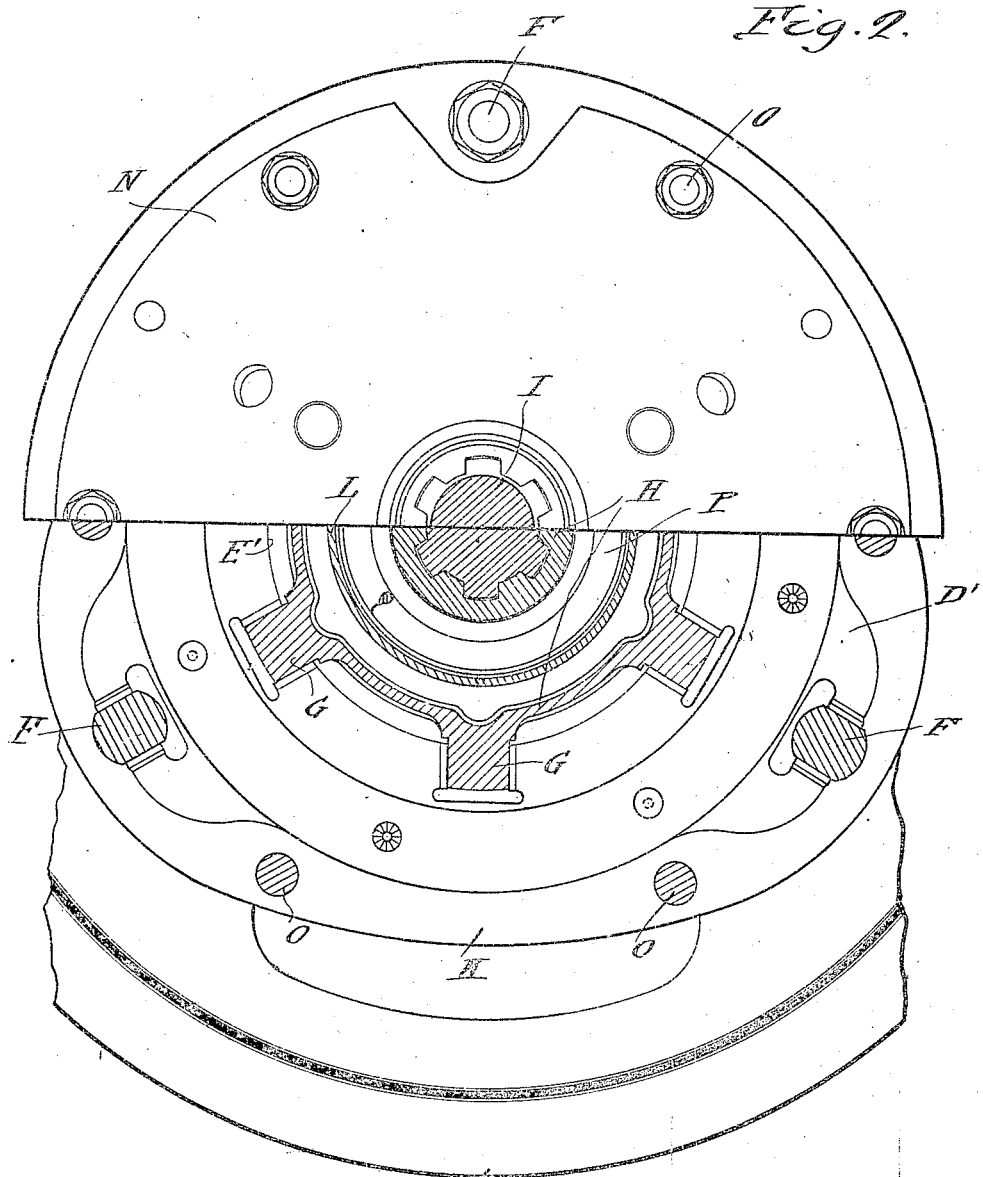

UNITED STATES PATENT OFFICE.

ENOS A. DE WATERS, OF FLINT, MICHIGAN, ASSIGNOR TO GENERAL MOTORS CORPORATION, OF DETROIT, MICHIGAN, A CORPORATION OF DELAWARE.

CLUTCH.

1,287,257.   Specification of Letters Patent.   Patented Dec. 10, 1918.

Application filed October 8, 1917.   Serial No. 195,302.

*To all whom it may concern:*

Be it known that I, ENOS A. DE WATERS, a citizen of the United States of America, residing at Flint, in the county of Genesee and State of Michigan, have invented certain new and useful Improvements in Clutches, of which the following is a specification, reference being had therein to the accompanying drawings.

The invention relates to clutches for rotary transmission shafts of that type known as multiple-disk and it is the object of the invention to reduce the inertia factor in the driven member. It is usual in the construction of clutches of this type to provide a series of parallelly-arranged disks which are alternately keyed to the drive and driven members. These disks are brought into frictional contact by resilient pressure of the clutch spring whenever the controlling pedal is released, the pressure being applied through the medium of a clamp usually mounted on the driven member. Whenever the clutch is released, the inertia of the driven member will cause it to continue to revolve, and the greater the mass and the greater the average distance of the same from the axis of rotation, the larger will be this inertia factor. Thus to avoid clashing of the transmission gears during the shifting thereof time must be given for the driven part to come to substantial rest.

With the present invention I have greatly reduced this inertia factor, by removing the heavy clamping plates and actuating spring from the driven member. This has the advantage not only of reduction in mass but also of removing that portion of the mass which is farthest from the axis of rotation and which consequently exerts the greatest torque. As a result the driven member when released will quickly come to rest and without the necessity of applying a brake, as is sometimes done.

In the drawings:

Fig. 2 is a view thereof partly in elevation and partly in cross-section taken on line 2—2 of Fig. 1.

Figure 1:
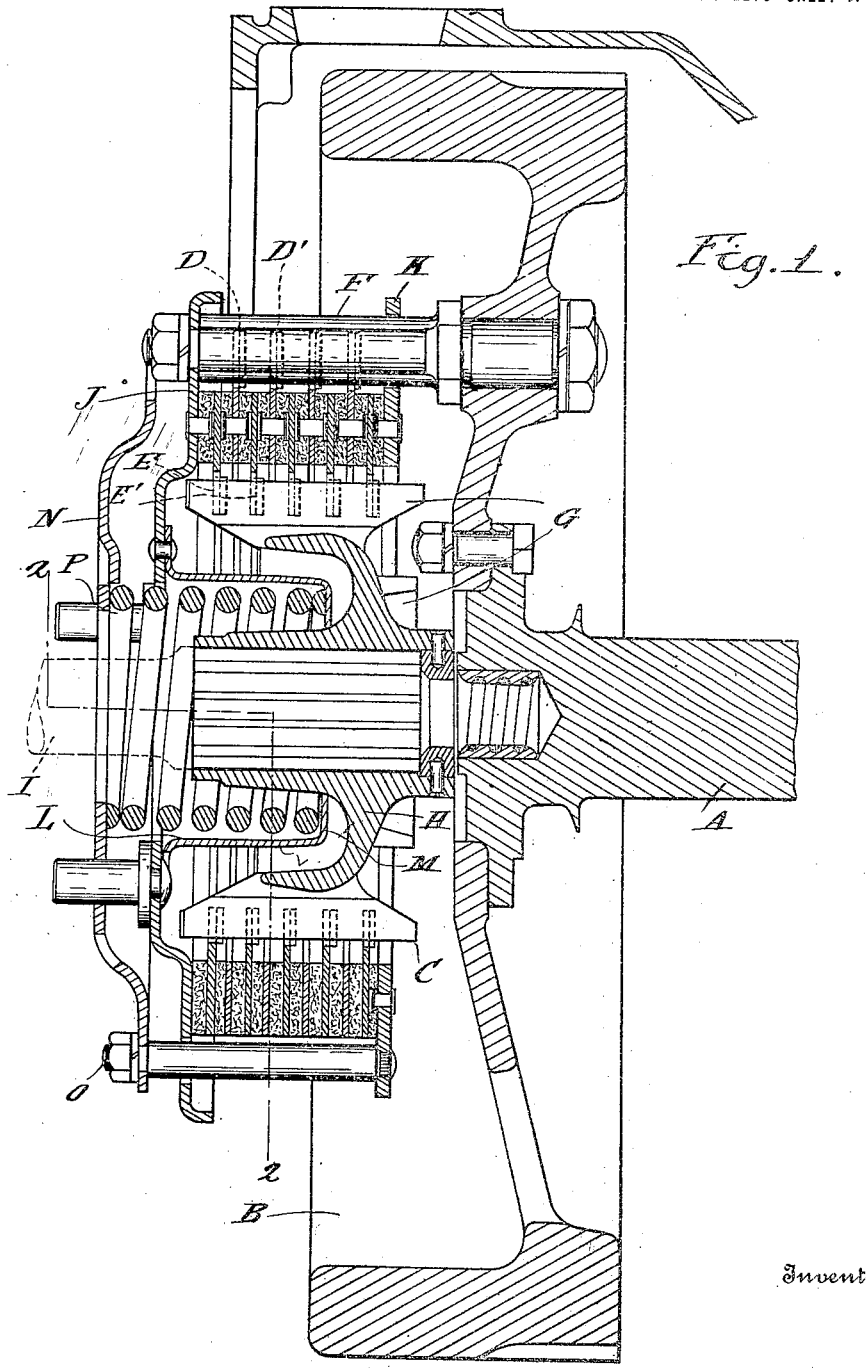
Figure 1 is a longitudinal section through the clutch.

A is the engine crank-shaft, B the fly-wheel and C a multiple-disk clutch arranged within the fly-wheel. This clutch comprises a series of driving disks D D', etc., and an alternate series of driven disks E E', etc., these being parallelly arranged concentric to the axis of the shaft. The disks D D', etc., are anchored so as to revolve with the fly-wheel by peripherally-engaging bolts or studs F, and the disks E E', etc., are connected at their inner edges to bearings G on a spider or hub member H, which in turn is mounted on the driven shaft I. Both the series of disks are free to move toward or from each other parallel to the axis of rotation and therefore if clamping pressure is applied to the opposite ends of the series the disks will be pressed into frictional contact.

The clamping means for the disks comprises the clamping plate J which is arranged to bear against the outer end of the series of disks and a clamping plate K arranged at the inner end thereof. The clamping plate J is fixedly secured to the fly-wheel B by means of a shouldered engagement with the outer ends of the studs F. The inner clamping plate slidably engages said anchoring studs F and thus both plates are compelled to revolve with the fly-wheel. The inner clamping plate is of annular form and the central aperture therein is of sufficient diameter to clear the spider or hub H, together with the bearing G thereon. On the other hand, the outer disk J extends inward but in a plane outside of the hub H and bearings G, and is provided with an inwardly-extending cylindrical flange L entering a recess in the hub H and terminating in a spring abutment flange M. N is a third plate which is arranged outside of the plate J and which is connected by tie-bolts O with the inner clamping plate K and this plate N extends inward so as to form an opposite abutment for the spring P, which latter is sleeved about the shaft and hub, one end engaging said plate N and the other the abutment flange M upon the cylindrical flange L.

With the construction as described the spring P, which is under compression, will exert a yielding pressure, tending to force the plates N and J away from each other. As the plate N is connected to the clamping plate K, the latter will be simultaneously operated, with a result that the plates J and K are pressed oppositely against the series of disks to bring the same into frictional contact. To release the clutch pressure is applied to the outer plate N through the medium of any suitable operating mechanism (not shown). This pressure will cause the compression of the spring P against the abutment M, which latter together with the plate J to which it is attached is held from movement by the shouldered studs F. On the other hand, the plate K, which is connected by the tie-rods O with the plate N, will be moved inward, thereby relieving the clamping pressure on the series of disks and permitting the disks E—E' to freely slide.

It will be observed that when thus released the driven member, comprising the spider G and disks E—E', is free to come to rest, and as the parts composing this member are of relatively small mass the inertia factor is correspondingly small.

What I claim as my invention is:

1. A clutch, comprising a series of alternately arranged annular drive and driven disks, a driven member arranged within and connected to the driven disks, a driving member arranged outside of and connected to the driving disks, clamping plates at opposite ends of the series of disks rotatively connected to said driving member, one of said plates being longitudinally fixed and the other longitudinally movable, a spring within said disks and connections between said spring and said clamping plates to cause the yieldable engagement of the latter.

2. A clutch, comprising a series of alternately arranged drive and driven disks, a driven member within the driven disks having a spline connection therewith, a driving member, a pair of clamping plates for the series of disks secured to said driving member at one side thereof to be rotatively fixed in relation thereto, the clamping plate nearest adjacent the driving member being longitudinally movable and the other clamping plate longitudinally fixed, a third plate arranged on the opposite side of said fixed plate from said movable plate, a tie-connection between said third plate and the movable plate, and a spring interposed between said third plate and fixed plate exerting a yieldable pressure for actuating said clamping plates to clamp the series.

3. A clutch, comprising alternately arranged annular drive and driven disks, a hub within said disks having a splined engagement with the driven members thereof, a driving member having a splined engagement with the driving members of said disks, clamping plates arranged at opposite ends of the series and rotatively fixed to said driving member, one of said plates being also longitudinally fixed and the other longitudinally adjustable in relation to said member, a spring arranged within said disks and within an annular recess in said hub member, an abutment for the inner end of said spring connected to said fixed clamping plate, a plate forming an abutment for the opposite end of said spring, and a tie-connection between said plate and the movable clamping plate.

4. A clutch, comprising a series of alternately arranged annular drive and driven disks, a hub within the series of disks having a splined engagement with the driven members thereof, said hub having an annular recess in its outer side, a driving member, studs mounted on said driving member and engaging said driving disks to hold the same from relative rotary movement, a clamping plate for the outer end of the series of disks fixedly secured to said studs, a clamping plate for the inner end of said series of disks slidably mounted on said studs, a plate outside of said fixed clamping plate, tie-connections between said outer plate and the inner clamping plate, a spring arranged within said annular recess in said hub, and an abutment for one end of said spring secured to said fixed clamping plate, the opposite end of said spring abutting against said outer plate, for the purpose described.

5. A clutch, comprising a series of alternately arranged annular drive and driven disks, a driven member arranged within and connected to the driven disks, a fly-wheel connected to the driving disks, a pair of clamping plates rotatively connected to the fly-wheel, one of said plates being longitudinally slidable between said disks and the fly-wheel and the other longitudinally fixed at the other side of the disks, and a spring acting upon the slidable clamping plate to actuate the same to clamp the disks.

6. A clutch, comprising a series of alternately arranged annular drive and driven disks, a driven member arranged within and connected to the driven disks, a fly-wheel connected to the driving disks, a pair of clamping plates rotatively connected to the fly-wheel, one of said plates being longitudinally slidable between said disks and the fly-wheel and the other plate being longitudinally fixed at the other side of the disks, and a spring within said disks acting upon the slidable clamping plate to actuate the same to clamp the disks.

7. A clutch, comprising a series of alternately arranged drive and driven disks, a driven member within the driven disks and rotatively connected therewith, a driving member, a pair of clamping plates for the series of disks secured to said driving member to be rotatively fixed in relation thereto, the clamping plate nearest adjacent the driving member being longitudinally movable relative to said member and the other clamping plate being longitudinally fixed, a third plate arranged on the opposite side of said fixed plate from said movable plate, a plurality of tie connections peripherally connecting the sliding plate and said third plate extending outside of said disks, and a spring interposed between said third plate and the fixed clamping plate exerting a yieldable pressure for actuating said clamping plates to clamp the disks.

8. A clutch, comprising a series of alternately arranged annular drive and driven disks, a hub within said disks having a rotative engagement with the driven members thereof, said hub being formed with an annular recess, a driving member having a rotative engagement with the driving members of said disks, clamping plates arranged at opposite ends of the series and rotatively fixed to said driving member, one of said plates being also longitudinally fixed and the other longitudinally adjustable in relation to said member, a spring arranged within said recess of the hub member, and connections between said spring and said clamping plates to cause the yieldable engagement of the latter.

In testimony whereof I affix my signature.

ENOS A. DE WATERS.